(12) United States Patent
Usoro et al.

(10) Patent No.: US 6,645,115 B1
(45) Date of Patent: Nov. 11, 2003

(54) FAMILY OF MULTI-SPEED POWER TRANSMISSION MECHANISMS HAVING THREE PLANETARY GEARSETS AND FIVE TORQUE-TRANSMITTING MECHANISMS

(75) Inventors: Patrick Benedict Usoro, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/160,971

(22) Filed: May 31, 2002

(51) Int. Cl.[7] .............................. F16H 3/62; F16H 3/44
(52) U.S. Cl. ........................................ 475/275; 475/296
(58) Field of Search ................................. 475/275, 296

(56) References Cited

U.S. PATENT DOCUMENTS

| 4,070,927 | A |   | 1/1978 | Polak | 74/765 |
|---|---|---|---|---|---|
| 5,106,352 | A |   | 4/1992 | Lepelletier | 475/753 |
| 5,599,251 | A |   | 2/1997 | Beim et al. | 475/275 |
| 6,071,208 | A |   | 6/2000 | Koivunen | 475/275 |
| 6,083,135 | A |   | 7/2000 | Baldwin et al. | 475/276 |
| 6,514,170 | B1 | * | 2/2003 | Kao et al. | 475/296 |
| 6,530,858 | B1 | * | 3/2003 | Usoro et al. | 475/296 |

FOREIGN PATENT DOCUMENTS

EP           1033510           6/2000

* cited by examiner

*Primary Examiner*—Dirk Wright
(74) *Attorney, Agent, or Firm*—Kathryn A. Marra

(57) ABSTRACT

A family of power transmissions which are utilized in a powertrain include three planetary gearsets and five torque-transmitting mechanisms. The torque-transmitting mechanisms are engaged in combinations of three to provide a reverse drive ratio and six forward speed ratios. The torque-transmitting mechanisms will include at least four rotating type torque-transmitting mechanisms and, in some instances, one stationary type torque-transmitting mechanism. The planetary gearsets are of either the single pinion type or of the double pinion type of planetary gearsets.

9 Claims, 10 Drawing Sheets

| | Ratios | 50 | 52 | 54 | 56 | 58 |
|---|---|---|---|---|---|---|
| Reverse | -1.92 | X | X | | | X |
| Neutral | 0.00 | | X | | | X |
| 1 | 3.54 | | X | X | | X |
| 2 | 1.98 | | X | | X | X |
| 3 | 1.34 | | | X | X | X |
| 4 | 1.00 | X | | | X | X |
| 5 | 0.78 | X | X | | X | |
| 6 | 0.62 | X | | X | X | |

(X=engaged clutch)

$\dfrac{RING\ GEAR}{SUN\ GEAR}$ = TOOTH RATIO: $\dfrac{R_1}{S_1}=2.99,\ \dfrac{R_2}{S_2}=1.60,\ \dfrac{R_3}{S_3}=2.43$

| Ratio Spread | 5.69 |
|---|---|
| Ratio Steps | |
| Rev/1 | -0.54 |
| 1/2 | 1.79 |
| 2/3 | 1.48 |
| 3/4 | 1.34 |
| 4/5 | 1.28 |
| 5/6 | 1.26 |

| | Ratios | 150 | 152 | 154 | 156 | 158 |
|---|---|---|---|---|---|---|
| Reverse | -1.62 | X | | X | | X |
| Neutral | 0.00 | X | | X | | |
| 1 | 2.53 | X | | X | X | |
| 2 | 1.58 | | X | X | X | |
| 3 | 1.00 | X | X | X | | |
| 4 | 0.75 | X | X | | X | |
| 5 | 0.52 | X | X | | | X |
| 6 | 0.40 | | X | | X | X |

(X=engaged clutch)

$\dfrac{\text{RING GEAR}}{\text{SUN GEAR}}$ =TOOTH RATIO: $\dfrac{R_1}{S_1}=1.50$, $\dfrac{R_2}{S_2}=1.67$, $\dfrac{R_3}{S_3}=1.53$

| Ratio Spread | 6.33 |
|---|---|
| Ratio Steps | |
| Rev/1 | -0.64 |
| 1/2 | 1.61 |
| 2/3 | 1.58 |
| 3/4 | 1.34 |
| 4/5 | 1.42 |
| 5/6 | 1.31 |

| | Ratios | 250 | 252 | 254 | 256 | 258 |
|---|---|---|---|---|---|---|
| Reverse | -2.82 | X | | X | X | |
| Neutral | 0.00 | X | | | | |
| 1 | 3.34 | X | X | | | X |
| 2 | 1.94 | | X | | X | X |
| 3 | 1.30 | X | X | | X | |
| 4 | 1.00 | X | X | X | | |
| 5 | 0.68 | X | | X | | X |
| 6 | 0.60 | | | X | X | X |

(X=engaged clutch)

$\dfrac{\text{RING GEAR}}{\text{SUN GEAR}}$ = TOOTH RATIO: $\dfrac{R_1}{S_1} = 1.50$, $\dfrac{R_2}{S_2} = 2.90$, $\dfrac{R_3}{S_3} = 2.03$

| Ratio Spread | 5.57 |
|---|---|
| Ratio Steps | |
| Rev/1 | -0.84 |
| 1/2 | 1.73 |
| 2/3 | 1.49 |
| 3/4 | 1.30 |
| 4/5 | 1.47 |
| 5/6 | 1.14 |

| | Ratios | 350 | 352 | 354 | 356 | 358 |
|---|---|---|---|---|---|---|
| Reverse | -1.92 | X | X | | | X |
| Neutral | 0.00 | | X | | | X |
| 1 | 3.48 | | X | X | | X |
| 2 | 1.98 | | X | | X | X |
| 3 | 1.34 | | | X | X | X |
| 4 | 1.00 | X | | | X | X |
| 5 | 0.79 | X | X | | X | |
| 6 | 0.63 | X | X | X | | |

(X=engaged clutch)

$\dfrac{\text{RING GEAR}}{\text{SUN GEAR}}$ =TOOTH RATIO: $\quad \dfrac{R_1}{S_1}=2.99, \quad \dfrac{R_2}{S_2}=1.53, \quad \dfrac{R_3}{S_3}=2.33$

| Ratio Spread | 5.51 |
|---|---|
| Ratio Steps | |
| Rev/1 | -0.55 |
| 1/2 | 1.76 |
| 2/3 | 1.48 |
| 3/4 | 1.34 |
| 4/5 | 1.27 |
| 5/6 | 1.25 |

| | Ratios | 450 | 452 | 454 | 456 | 458 |
|---|---|---|---|---|---|---|
| Reverse | -1.42 | X | | | X | X |
| Neutral | 0.00 | X | | | | X |
| 1 | 2.53 | X | X | | | X |
| 2 | 1.54 | | X | | X | X |
| 3 | 1.00 | X | X | | X | |
| 4 | 0.65 | | X | X | X | |
| 5 | 0.52 | X | | X | X | |
| 6 | 0.39 | | | X | X | X |

(X=engaged clutch)

$\frac{RING\ GEAR}{SUN\ GEAR}$ =TOOTH RATIO: $\frac{R_1}{S_1}=2.99,\quad \frac{R_2}{S_2}=1.58,\quad \frac{R_3}{S_3}=1.53$

| Ratio Spread | 6.44 |
|---|---|
| Ratio Steps | |
| Rev/1 | -0.56 |
| 1/2 | 1.64 |
| 2/3 | 1.54 |
| 3/4 | 1.54 |
| 4/5 | 1.25 |
| 5/6 | 1.31 |

| | Ratios | 558 | 550 | 552 | 554 | 556 |
|---|---|---|---|---|---|---|
| Reverse | -1.51 | X | | X | X | |
| Neutral | 0.00 | | | X | X | |
| 1 | 1.75 | | | X | X | X |
| 2 | 1.00 | | X | X | | X |
| 3 | 0.67 | | X | X | X | |
| 4 | 0.50 | | X | | X | X |
| 5 | 0.37 | X | X | | X | |
| 6 | 0.30 | X | X | | | X |

(X=engaged clutch)

$\frac{\text{RING GEAR}}{\text{SUN GEAR}}$ =TOOTH RATIO: $\frac{R_1}{S_1}$=2.33, $\frac{R_2}{S_2}$=2.52, $\frac{R_3}{S_3}$=2.34

| Ratio Spread | 5.84 |
|---|---|
| Ratio Steps | |
| Rev/1 | -0.86 |
| 1/2 | 1.75 |
| 2/3 | 1.50 |
| 3/4 | 1.34 |
| 4/5 | 1.33 |
| 5/6 | 1.25 |

| | Ratios | 658 | 650 | 652 | 654 | 656 |
|---|---|---|---|---|---|---|
| Reverse | -1.53 | X | X | | | X |
| Neutral | 0.00 | | X | | | X |
| 1 | 1.75 | | X | X | | X |
| 2 | 1.00 | | | X | X | X |
| 3 | 0.67 | | X | | X | X |
| 4 | 0.50 | | X | X | X | |
| 5 | 0.38 | X | X | | X | |
| 6 | 0.30 | X | | X | X | |

(X=engaged clutch)

$\frac{RING\ GEAR}{SUN\ GEAR}$ =TOOTH RATIO: $\frac{R_1}{S_1}=2.30,\quad \frac{R_2}{S_2}=2.52,\quad \frac{R_3}{S_3}=2.34$

| Ratio Spread | 5.78 |
|---|---|
| Ratio Steps | |
| Rev/1 | -0.87 |
| 1/2 | 1.75 |
| 2/3 | 1.49 |
| 3/4 | 1.33 |
| 4/5 | 1.33 |
| 5/6 | 1.25 |

| | Ratios | 750 | 752 | 754 | 756 | 758 |
|---|---|---|---|---|---|---|
| Reverse | -3.40 | X | | | X | X |
| Neutral | 0.00 | | | | X | X |
| 1 | 3.41 | | X | | X | X |
| 2 | 2.04 | | X | X | | X |
| 3 | 1.38 | | X | X | X | |
| 4 | 1.00 | X | | | X | X |
| 5 | 0.75 | X | X | X | | |
| 6 | 0.54 | X | X | | X | |

(X=engaged clutch)

$\dfrac{\text{RING GEAR}}{\text{SUN GEAR}}$ = TOOTH RATIO: $\dfrac{R_1}{S_1}=2.61$, $\dfrac{R_2}{S_2}=3.00$, $\dfrac{R_3}{S_3}=1.53$

| Ratio Spread | 6.30 |
|---|---|
| Ratio Steps | |
| Rev/1 | -1.00 |
| 1/2 | 1.67 |
| 2/3 | 1.48 |
| 3/4 | 1.38 |
| 4/5 | 1.33 |
| 5/6 | 1.38 |

| | Ratios | 858 | 850 | 852 | 854 | 856 |
|---|---|---|---|---|---|---|
| Reverse | -1.53 | X | X | X | | |
| Neutral | 0 | | X | X | | |
| 1 | 2.34 | | X | X | X | |
| 2 | 1.53 | | | X | X | X |
| 3 | 1 | | X | X | | X |
| 4 | 0.76 | | X | | X | X |
| 5 | 0.53 | X | X | | | X |
| 6 | 0.39 | X | | | X | X |

(X=engaged clutch)

$\frac{RING\ GEAR}{SUN\ GEAR}$ = TOOTH RATIO: $\frac{R_1}{S_1}=1.86,\quad \frac{R_2}{S_2}=1.65,\quad \frac{R_3}{S_3}=1.88$

| Ratio Spread | 5.95 |
|---|---|
| Ratio Steps | |
| Rev/1 | -0.65 |
| 1/2 | 1.53 |
| 2/3 | 1.53 |
| 3/4 | 1.31 |
| 4/5 | 1.44 |
| 5/6 | 1.35 |

| | Ratios | 950 | 952 | 954 | 956 | 958 |
|---|---|---|---|---|---|---|
| Reverse | -1.62 | X | | X | | X |
| Neutral | 0.00 | X | | X | | |
| 1 | 2.53 | X | | X | X | |
| 2 | 1.58 | | X | X | X | |
| 3 | 1.00 | X | X | X | | |
| 4 | 0.75 | X | X | | X | |
| 5 | 0.52 | X | X | | | X |
| 6 | 0.40 | | X | | X | X |

(X=engaged clutch)

$\dfrac{\text{RING GEAR}}{\text{SUN GEAR}}$ = TOOTH RATIO: $\dfrac{R_1}{S_1}=2.50,\ \dfrac{R_2}{S_2}=1.67,\ \dfrac{R_3}{S_3}=1.53$

| Ratio Spread | 6.33 |
|---|---|
| Ratio Steps | |
| Rev/1 | -0.64 |
| 1/2 | 1.61 |
| 2/3 | 1.58 |
| 3/4 | 1.34 |
| 4/5 | 1.42 |
| 5/6 | 1.31 |

US 6,645,115 B1

FAMILY OF MULTI-SPEED POWER TRANSMISSION MECHANISMS HAVING THREE PLANETARY GEARSETS AND FIVE TORQUE-TRANSMITTING MECHANISMS

TECHNICAL FIELD

The present invention relates to power transmissions and, more particularly, to a family of transmissions having three planetary gearsets that are controlled by five torque-transmitting mechanisms to provide six forward speed ratios and one reverse speed ratio.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier employs three planetary gearsets, three clutches and two brakes to provide six forward speed ratios and one reverse ratio. One of the planetary gearsets in Lepelletier is positioned and operated to establish two fixed speed input members for the remaining two planetary gearsets.

SUMMARY OF THE INVENTION

It is an object of the present invention to provide an improved family of transmissions operating in a powertrain and being capable of providing at least six forward speed ratios and one reverse speed ratio.

In one aspect of the present invention, each family member has three planetary gearsets each consisting of a sun gear member, a ring gear member, and a planet carrier assembly member. In another aspect of the present invention, each family member includes five torque-transmitting mechanisms that are operable to control the speed ratios of the planetary gearsets. In yet another aspect of the present invention, a fixed interconnecting member continuously interconnects a first member of the second planetary gearset with a first member of the third planetary gearset. In yet still another aspect of the present invention, a second member of the third planetary gearset is continuously connected with a stationary member such as a transmission housing.

In still another aspect of the present invention, the input shaft is continuously connected with a member of the first or second planetary gearset, and the output shaft is continuously connected with a member of the first or second planetary gearset. In yet still another aspect of the present invention, the five torque-transmitting mechanisms are comprised of either five clutches, or four clutches and one brake. In a further aspect of the present invention, a first of the torque-transmitting mechanisms selectively connects a member of the first planetary gearset with either the input shaft, the fixed interconnecting member, or a member of the second or third planetary gearset.

In a yet further aspect of the present invention, a second of the torque-transmitting mechanisms selectively interconnects a member of the second planetary gearset with either the input shaft, the output shaft, the fixed interconnecting member, or a member of the first or third planetary gearsets. In a still further aspect of the present invention, a third of the torque-transmitting mechanisms selectively connects a member of the third planetary gearset with either the input shaft, the output shaft, the fixed interconnecting member, or a member of the& first or second planetary gearsets.

In yet still a further aspect of the present invention, a fourth of the torque-transmitting mechanisms selectively interconnects a member of the first, second or third planetary gearset with either the fixed interconnecting member or another member of the first, second or third planetary gearsets. In yet another aspect of the present invention, a fifth torque-transmitting mechanism selectively connects a member of the first, second or third planetary gearset with either another member of the first, second or third planetary gearset, or connects a member of the first, second or third planetary gearset with a stationary member of the transmission. In still another aspect of the present invention, the five torque-transmitting mechanisms are selectively actuated or engaged in combinations of three to establish at least six forward speed ratios and one reverse speed ratio between the input and output shafts of the transmission.

DESCRIPTION OF EXEMPLARY EMBODIMENTS

Figures 1, 2:
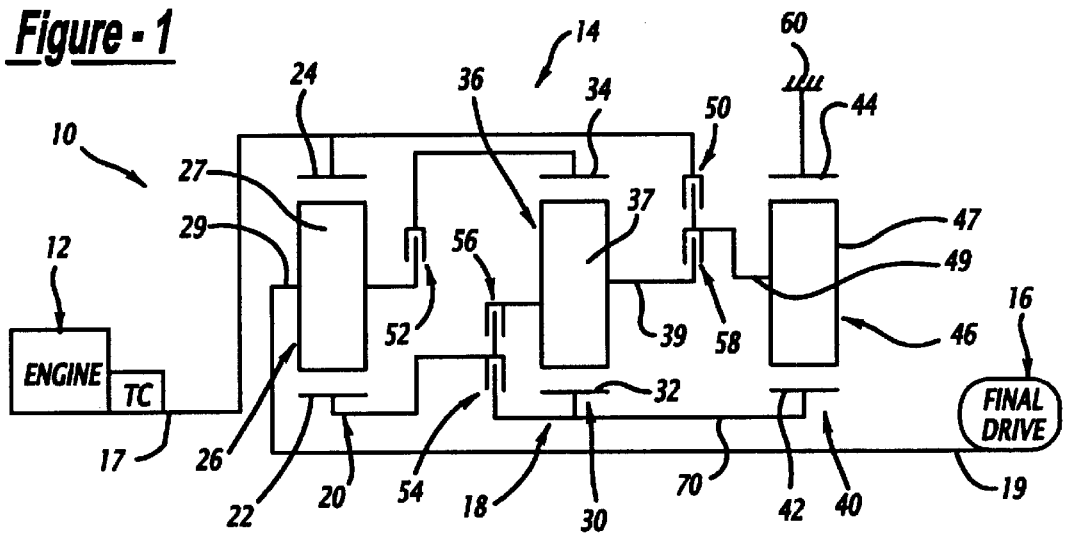
FIG. 1 is a schematic representation of a powertrain having a transmission family member incorporating the present invention.
FIG. 2 is a truth table and chart describing some of the operating characteristics of the powertrain depicted in FIG. 1.

Referring to the drawings, wherein like characters represent the same or corresponding parts throughout the several views, there is seen in FIG. 1 a powertrain 10 that includes a conventional engine and torque converter 12, a planetary transmission 14, and a conventional final drive mechanism 16. The planetary transmission 14 includes an input shaft 17, a planetary gear arrangement 18, and an output shaft 19. The planetary gear arrangement 18 includes three planetary gearsets 20, 30, and 40.

The planetary gearset 20 includes a sun gear member 22, a ring gear member 24, and a planet carrier assembly member 26 which includes a plurality of pinion gears 27 rotatably mounted on a carrier 29 and disposed in meshing relationship with both the sun gear member 22 and the ring gear member 24.

The planetary gearset 30 includes a sun gear member 32, a ring gear member 34, and a planet carrier assembly member 36 which includes a plurality of pinion gears 37 rotatably mounted on a carrier 39 and disposed in meshing relationship with both the sun gear member 32 and the ring gear member 34.

The planetary gearset 40 includes a sun gear member 42, a ring gear member 44, and a planet carrier assembly member 46 which includes a plurality of pinion gears 47 rotatably mounted on a carrier 49 and disposed in meshing relationship with both the sun gear member 42 and the ring gear member 44.

The planetary gear arrangement 18 also includes five torque-transmitting mechanisms 50, 52, 54, 56, and 58. The torque-transmitting mechanisms are conventional selectively engaged fluid-operated devices. The torque-transmitting mechanisms are preferably controlled by a conventional electro-hydraulic system, not shown, that includes a preprogrammed digital computer.

The input shaft 17 is continuously connected with the engine and torque converter 12 and the ring gear member 24. The output shaft 19 is continuously connected with the final drive mechanism 16 and the planet carrier assembly member 26. The sun gear members 32 and 42 are continuously interconnected by an interconnecting member 70. The ring gear member 44 is continuously connected with a transmission housing 60 that is a stationary member in the transmission and serves to ground the ring gear member 44.

The ring gear member 24 and input shaft 17 are selectively connectable with the planet carrier assembly member 46 through the torque-transmitting mechanism 50. The output shaft 19 and planet carrier assembly member 26 are selectively connectable with the ring gear member 34 through the torque-transmitting mechanism 52. The sun gear member 22 is selectively connectable with the sun gear members 32 and 42 and therefore the interconnecting member 70 through the torque-transmitting mechanism 54. The sun gear member 22 is also selectively connectable with the planet carrier assembly member 36 through the torque-transmitting mechanism 56. The planet carrier assembly member 36 and planet carrier assembly member 46 are selectively connectable together through the torque-transmitting mechanism 58.

The torque-transmitting mechanisms 50, 52, 54, 56, and 58 are selectively connectable in combinations of three, as shown in FIG. 2, to provide six forward speed ratios and one reverse speed ratio.

To establish the reverse speed ratio, the torque-transmitting mechanisms 50, 52, and 58 are engaged. With this combination of engagements, the output shaft 19 is selectively connected with the ring gear member 34, and the input shaft 17 is selectively connected with both the planet carrier assembly member 46 and the planet carrier assembly member 36. The sun gear members 42 and 32 are driven forwardly at a speed determined by the speed of the planet carrier assembly member 46 and the ring gear/sun gear tooth ratio of the planetary gearset 40. The ring gear member 34 and therefore output shaft 19 is driven in reverse at a speed determined by the speed of sun gear member 32, the speed of the planet carrier assembly member 36, and ring gear/sun gear tooth ratio of the planetary gearset 30. The overall numerical value of the reverse speed ratio is determined by the ring gear/sun gear tooth ratios of the planetary gearsets 30 and 40.

As noted in FIG. 2, the torque-transmitting mechanisms 52 and 58 are also engaged in the first forward speed ratio as well as the torque-transmitting mechanism 54. Therefore, the torque-transmitting mechanisms 52 and 58 can remain engaged through the neutral condition thereby simplifying the forward/reverse shift sequence.

During the first forward speed ratio, the sun gear members 22, 32, and 42 are driven in reverse at a speed determined by the speed of the ring gear member 24, the speed of the planet carrier assembly member 26, and the ring gear/sun gear tooth ratio of the planetary gearset 20. Planet carrier assembly members 46 and 36 are driven in reverse at a speed determined by the speed of the sun gear member 42 and the ring gear/sun gear tooth ratio of the planetary gearset 40. Ring gear member 34, planet carrier assembly member 26, and output shaft 19 are driven forwardly at a speed determined by the speed of the sun gear member 32, the speed of planet carrier assembly member 36, and the ring gear/sun gear tooth ratio of the planetary gearset 30. The overall numerical value of the first forward speed ratio is determined by the ring gear/sun gear tooth ratios of the planetary gearsets 20, 30, and 40.

The second forward speed ratio is determined by the engagement of the torque-transmitting mechanisms 52, 56, and 58. The first to second ratio interchange is a single transition shift. The sun gear member 22, planet carrier assembly member 36, and the planet carrier assembly member 46 are driven in reverse at a speed determined by the speed of the ring gear member 24, the speed of the planet carrier assembly member 26 and the ring gear/sun gear tooth ratio of the planetary gearset 20. The sun gear members 42 and 32 are driven in reverse at a speed determined by the speed of the planet carrier assembly member 46 and the ring gear/sun gear tooth ratio of the planetary gearset 40. The ring gear member 34, the planet carrier assembly member 26, and the output shaft 19 are driven forwardly at a speed determined by the speed of the sun gear member 32, the speed of the planet carrier assembly member 36, and the ring gear/sun gear tooth ratio of the planetary gearset 30. The overall numerical value of the second forward speed ratio is determined by the ring gear/sun gear tooth ratios of the planetary gearsets 20, 30, and 40.

To establish the third forward speed ratio, the torque-transmitting mechanisms 54, 56, and 58 are engaged. With this combination of engagements, the planetary gearsets 40 and 30 are held stationary as well as the sun gear member 22. The planet carrier assembly member 26 and the output shaft 19 are driven forwardly at a reduced speed ratio determined by the speed of the ring gear member 24 and the ring gear/sun gear tooth ratio of the planetary gearset 20. The overall numerical value of the third forward speed ratio is determined by the ring gear/sun gear tooth ratio of the planetary gearset 20.

The fourth forward speed ratio is established with the engagement of the torque-transmitting mechanisms 50, 56, and 58. The third to fourth ratio interchange is a single transition shift. During the fourth forward speed ratio, the sun gear member 22 is driven at the same speed as the input shaft 17 and therefore ring gear member 24. The output shaft 19 and planet carrier assembly member 26 are also rotated at the speed of the input shaft 17 such that the fourth forward speed ratio is a 1:1 drive.

The fifth forward speed ratio is established with the engagement of the torque-transmitting mechanisms 50, 52, and 56. During the fifth forward speed ratio, the sun gear members 42 and 32 are driven forwardly at an increased speed ratio determined by the speed of the planet carrier assembly member 46 and the ring gear/sun gear tooth ratio of the planetary gearset 40. The sun gear member 22 is driven at a speed determined by the speed of the ring gear member 24, the speed of the planet carrier assembly member 26, and the ring gear/sun gear tooth ratio of the planetary gearset 20. The ring gear member 34, planet carrier assembly member 26, and output shaft 19 are driven forwardly at an increased speed ratio determined by the speed of the sun gear member 32, the speed of the planet carrier assembly member 36, and the ring gear/sun gear tooth ratio of the planetary gearset 30. The overall numerical value of the fifth forward speed ratio is determined by the planetary gearsets 20, 30, and 40.

The sixth forward speed ratio is established with the engagement of the torque-transmitting mechanisms 50, 54, and 56. The ratio interchange from fifth to sixth is a single transition shift. During the sixth forward speed ratio, the sun gear members 42, 32, and 22 are rotated forwardly at an increased speed ratio determined by the speed of the planet carrier assembly member 46 and the ring gear/sun gear tooth ratio of the planetary gearset 40. The planet carrier assembly member 46 and the output shaft 19 are driven forwardly at a speed determined by the speed of the ring gear member 24, the speed of the sun gear member 22, and the ring gear/sun gear tooth ratio of the planetary gearset 20. The overall numerical value of the sixth forward speed ratio is determined by the planetary gearsets 20 and 40.

The truth table of FIG. 2 describes the interchange sequence of the torque-transmitting mechanisms 50, 52, 54, 56, and 58 for the forward speed ratios and the reverse speed ratio as described above. The truth table gives an example of numerical values that can be utilized with the planetary transmission 14. These numerical values are computed from the ring gear/sun gear tooth ratios of the planetary gearsets 20, 30, and 40 that actively transmit torque during the respective gear ratios. The ring gear/sun gear tooth ratios are also given as examples in FIG. 2. FIG. 2 further has a chart which provides the ratio steps between adjacent forward speed ratios and between the forward/reverse speed ratios. For example, the first to second step ratio is 1.79 when the given ring gear/sun gear tooth ratios examples are employed.

Figures 3, 4:
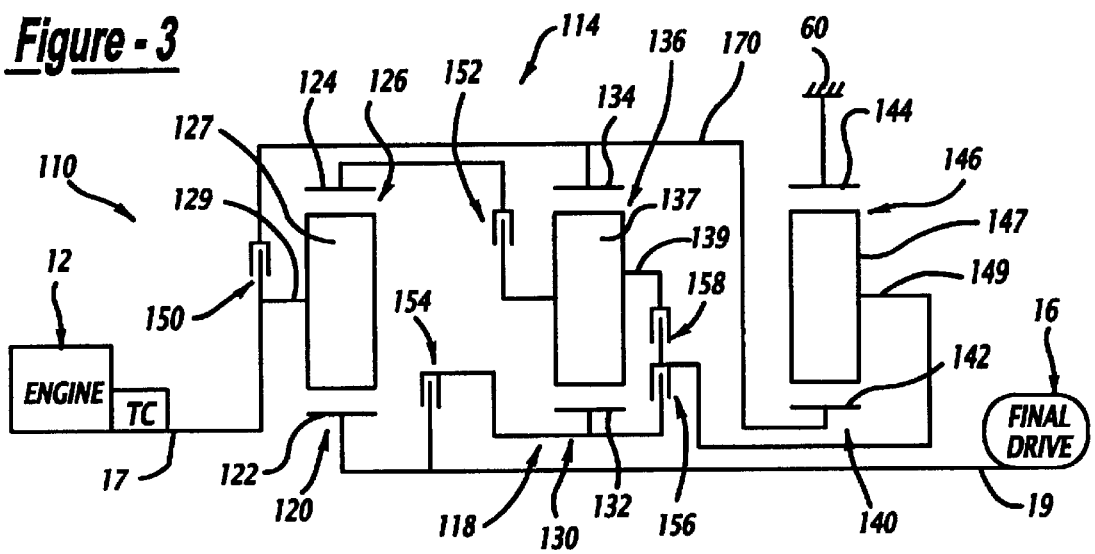
FIG. 3 is a schematic representation of a powertrain having another transmission family member incorporating the present invention.
FIG. 4 is a truth table and chart describing some of the operating characteristics of the powertrain depicted in FIG. 3.

A powertrain 110, shown in FIG. 3, includes the conventional engine and torque converter 12, a planetary transmission 114, and a conventional final drive mechanism 16. The planetary transmission 114 includes an input shaft 17, a planetary gear arrangement 118, and the output shaft 19. The planetary gear arrangement 118 includes three planetary gearsets 120, 130, and 140.

The planetary gearset 120 includes a sun gear member 122, a ring gear member 124, and a planet carrier assembly member 126 which includes a plurality of pinion gears 127 rotatably mounted on a carrier 129 and disposed in meshing relationship with both the sun gear member 122 and the ring gear member 124.

The planetary gearset 130 includes a sun gear member 132, a ring gear member 134, and a planet carrier assembly member 136 which includes a plurality of pinion gears 137 rotatably mounted on a carrier 139 and disposed in meshing relationship with both the sun gear member 132 and the ring gear member 134.

The planetary gearset 140 includes a sun gear member 142, a ring gear member 144, and a planet carrier assembly member 146 which includes a plurality of pinion gears 147 rotatably mounted on a carrier 149 and disposed in meshing relationship with both the sun gear member 142 and the ring gear member 144.

The planetary gear arrangement 118 also includes five torque-transmitting mechanisms 150, 152, 154, 156, and 158. The torque-transmitting mechanisms are conventional selectively engaged fluid-operated devices. The torque-transmitting mechanisms are preferably controlled by a conventional electro-hydraulic system, not shown, that includes a preprogrammed digital computer.

The input shaft 17 is continuously connected with the engine and torque converter 12 and the planet carrier assembly member 126. The output shaft 19 is continuously connected with the final drive mechanism 16 and the sun gear member 122. The sun gear member 142 and the ring gear member 134 are continuously interconnected by an interconnecting member 170. The ring gear member 144 is continuously connected with the stationary transmission housing 60.

The planet carrier assembly member 126 and input shaft 17 are selectively connectable with the interconnecting member 170 through the torque-transmitting mechanism 150. The output shaft 19 and the sun gear member 122 are selectively connectable with the sun gear member 132 through the torque-transmitting mechanism 154. The ring gear member 124 is selectively connectable with the planet carrier assembly members 136 through the torque-transmitting mechanism 152. The sun gear member 132 is also selectively connectable with the planet carrier assembly member 146 through the torque-transmitting mechanism 156. The planet carrier assembly member 136 and planet carrier assembly member 146 are selectively connectable together through the torque-transmitting mechanism 158.

The torque-transmitting mechanisms 150, 152, 154, 156, and 158 are selectively connectable in combinations of three, as shown in FIG. 2, to provide six forward speed ratios and one reverse speed ratio.

The truth table of FIG. 4 describes the engagement schedule for the torque-transmitting mechanisms 150, 152, 154, 156, and 158 which are engaged in combinations of three to provide the six forward speed ratios and the one reverse speed ratio.

To establish the reverse speed ratio, the torque-transmitting mechanisms 150, 154, and 158 are engaged. During the reverse speed ratio, the ring gear member 134 and sun gear member 142 are driven by the input shaft 17. The planet carrier assembly member 146 and planet carrier assembly member 136 are driven forwardly at a speed determined by the speed of the sun gear member 142 and the ring gear/sun gear tooth ratio of the planetary gearset 140. The sun gear member 132 and therefore output shaft 19 are driven in reverse at a speed determined by the speed of the ring gear member 134, the speed of the planet carrier assembly member 136, and the ring gear/sun gear tooth ratio of the planetary gearset 130. The overall numerical value of the reverse speed ratio is determined by the ring gear/sun gear tooth ratio of the planetary gearsets 130 and 140.

The first forward speed ratio is established by the engagement of the torque-transmitting mechanisms 150, 154, and 156. It should be noted that the torque-transmitting mechanisms 150 and 154 remain engaged through the neutral condition thereby simplifying the forward/reverse shift sequence. During the first forward speed ratio, the sun gear member 140 is driven by the input shaft 17. The planet carrier assembly member 146, sun gear member 132, and output shaft 19 are driven at the speed determined by the speed of the sun gear member 142 and the ring gear/sun gear tooth ratio of the planetary gearset 140.

To establish the second forward speed ratio, the torque-transmitting mechanisms 152, 154, and 156 are engaged. The first to second ratio interchange is a single transition shift. During the second forward speed ratio, the ring gear member 124 and planet carrier assembly member 136 are driven forwardly at a speed determined by the speed of the planet carrier assembly member 126, the speed of the sun gear member 122, and the ring gear/sun gear tooth ratio of the planetary gearset 120. The ring gear member 134 and sun gear member 142 are driven forwardly at a speed determined by the speed of the planet carrier assembly member 136, the speed of the sun gear member 132, and the ring gear/sun gear tooth ratio of the planetary gearset 130. The planet carrier assembly member 146, sun gear member 132, and output shaft 19 are driven forwardly at a speed determined by the speed of the sun gear member 142 and the ring gear/sun gear tooth ratio of the planetary gearset 140. The overall numerical value of the second forward speed ratio is determined by the ring gear/sun gear tooth ratios of the planetary gearsets 120, 130, and 140.

To establish the third forward speed ratio, the torque-transmitting mechanisms 150, 152, and 154 are engaged. The second to third ratio interchange is a single transition ratio shift. With this combination of torque-transmitting mechanisms engaged, the ring gear member 124 and planet carrier assembly member 136 rotate in unison, the input shaft 17, planet carrier assembly member 126, and ring gear member 134 rotate in unison, and the sun gear member 132, sun gear member 122, and output shaft 19 rotate in unison. Since the members of the planetary gearsets 120 and 130 all rotate in unison, the drive is a 1:1 ratio with the output shaft 19 being driven at the same speed as the input shaft 17.

The fourth forward speed ratio is established with the engagement of the torque-transmitting mechanisms 150, 152, and 156. The third to fourth interchange is a single transition shift. During the fourth forward speed ratio, the planet carrier assembly member 146 and the sun gear member 132 are driven forwardly at a speed determined by the speed of the sun gear member 142 and the ring gear/sun gear tooth ratio of the planetary gearset 140. The planet carrier assembly member 136 and ring gear member 124 are driven at a speed determined by the speed of the sun gear member 132, the speed of the ring gear member 134, and the ring gear/sun gear tooth ratio of the planetary gearset 130. The sun gear member 122 and output shaft 19 are driven forwardly at a speed determined by the speed of the planet carrier assembly member 126, the speed of the ring gear member 124, and the ring gear/sun gear tooth ratio of the planetary gearset 120. The overall numerical value of the fourth forward speed ratio is determined by the ring gear/sun gear tooth ratios of the planetary gearsets 120, 130, and 140.

The fifth forward speed ratio is established with the engagement of the torque-transmitting mechanisms 150, 152, and 158. The planet carrier assembly member 146, planet carrier assembly member 136, and the ring gear member 124 are driven at a speed determined by the speed of the sun gear member 142 and the ring gear/sun gear tooth ratio of the planetary gearset 140. The sun gear member 122 and therefore output shaft 19 are driven at a speed determined by the speed of the planet carrier assembly member 126, the speed of the ring gear member 124, and the ring gear/sun gear tooth ratio of the planetary gearset 120. The overall numerical value of the fifth forward speed ratio is determined by the ring gear/sun gear tooth ratios of the planetary gearsets 120 and 140.

The sixth forward speed ratio is established with the engagement of the torque-transmitting mechanisms 152, 156, and 158. With this combination of engagements, the planetary gearset 140 and the ring gear member 124 are held stationary. The sun gear member 122 and therefore output shaft 19 is driven forwardly at an increased speed ratio determined by the speed of the planet carrier assembly member 126 and the ring gear/sun gear tooth ratio of the planetary gearset 120. The overall numerical value of the sixth forward speed ratio is determined by the ring gear/sun gear tooth ratio of the planetary gearset 120.

Figures 5, 6:
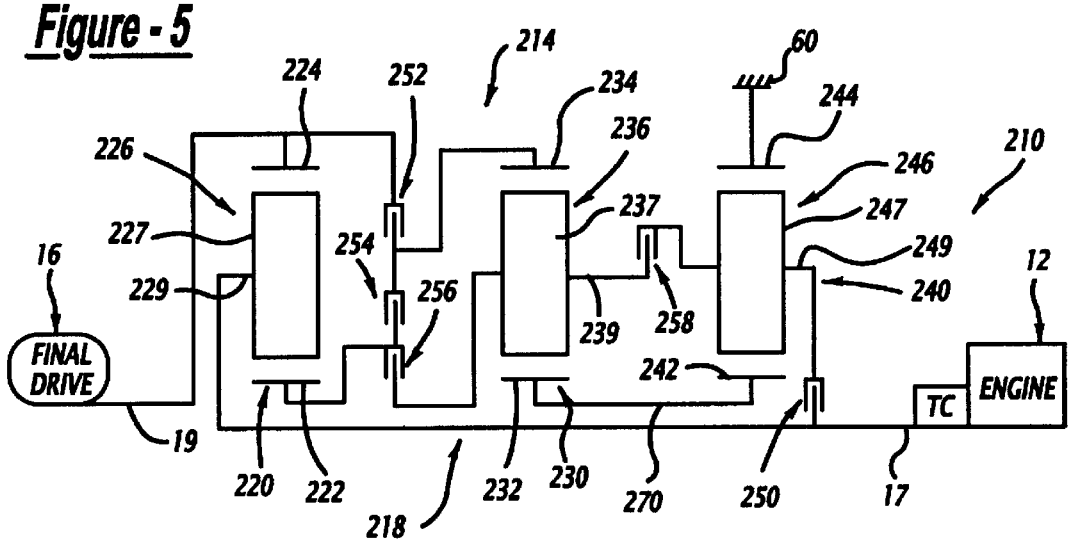
FIG. 5 is a schematic representation of a powertrain having another transmission family member incorporating the present invention.
FIG. 6 is a truth table and chart describing some of the operating characteristics of the powertrain depicted in FIG. 5.

A powertrain 210, shown in FIG. 5, includes the conventional engine and torque converter 12, a planetary transmission 214, and the conventional final drive mechanism 16. The planetary transmission 214 includes an input shaft 17, a planetary gear arrangement 218, and the output shaft 19. The planetary gear arrangement 218 includes three planetary gearsets 220, 230, and 240.

The planetary gearset 220 includes a sun gear member 222, a ring gear member 224, and a planet carrier assembly member 226 which includes a plurality of pinion gears 227 rotatably mounted on a carrier 229 and disposed in meshing relationship with both the sun gear member 222 and the ring gear member 224.

The planetary gearset 230 includes a sun gear member 232, a ring gear member 234, and a planet carrier assembly member 236 which includes a plurality of pinion gears 237 rotatably mounted on a carrier 239 and disposed in meshing relationship with both the sun gear member 232 and the ring gear member 234.

The planetary gearset 240 includes a sun gear member 242, a ring gear member 244, and a planet carrier assembly member 246 which includes a plurality of pinion gears 247 rotatably mounted on a carrier 249 and disposed in meshing relationship with both the sun gear member 242 and the ring gear member 244.

The planetary gear arrangement 218 also includes five torque-transmitting mechanisms 250, 252, 254, 256, and 258. The torque-transmitting mechanisms are conventional selectively engaged fluid-operated devices. The torque-transmitting mechanisms are preferably controlled by a conventional electro-hydraulic system, not shown, that includes a preprogrammed digital computer.

Input shaft 17 is continuously connected between the engine and torque converter 12 and the planet carrier assembly member 226. The output shaft 19 is continuously connected with the ring gear member 224. The sun gear members 232 and 242 are continuously interconnected by an interconnecting member 270, and the ring gear member 244 is continuously connected with the transmission housing 60. The input shaft 17 is selectively connectable with the planet carrier assembly member 246 through the torque-transmitting mechanism 250. The output shaft 19 and ring gear member 224 are selectively connectable with the ring gear member 234 through the torque-transmitting mechanism 252. The ring gear member 234 and sun gear member 222 are selectively interconnectable through the torque-transmitting mechanism 254. The sun gear member 222 and planet carrier assembly member 236 are selectively interconnectable through the torque-transmitting mechanism 256, and the planet carrier assembly member 236 and planet carrier assembly member 246 are selectively interconnectable through the torque-transmitting mechanism 258.

The truth table of FIG. 6 illustrates the engagement sequence of the torque-transmitting mechanisms 250, 252, 254, 256, and 258 to establish the reverse drive ratio and the forward drive ratios. The reverse drive ratio is established with the engagement of the torque-transmitting mechanisms 250, 254, and 256. With the engagement of the torque-transmitting mechanisms 254 and 256, the planetary gearset 230 will rotate as a single unit. The sun gear members 232 and 242 are rotated forwardly at a speed determined by the speed of the planet carrier assembly member 246 and the ring gear/sun gear tooth ratio of the planetary gearset 240. The sun gear member 222 is rotated forwardly at a speed equal to the speed of the sun gear members 232 and 242. The ring gear member 224 and therefore output shaft 19 are rotated in reverse at a speed determined by the speed of the sun gear member 222, the speed of the planet carrier assembly member 226, and the ring gear/sun gear tooth ratio of the planetary gearset 220. The overall numerical ratio of the reverse speed ratio is determined by the ring gear/sun gear tooth ratios of the planetary gearsets 240 and 220.

The first forward speed ratio is established with the engagement of the torque-transmitting mechanisms 250, 252, and 258. During the first forward speed ratio, the planet carrier assembly member 246 and planet carrier assembly member 236 are driven forwardly at a speed equal to the speed of the input shaft 17. The sun gear members 242 and 232 are driven at a speed determined by the speed of the planet carrier assembly member 246 and the ring gear/sun gear tooth ratio of the planetary gearset 240. The ring gear member 234 and output shaft 19 are driven at a speed determined by the speed of the sun gear member 232, the speed of the planet carrier assembly member 236, and the ring gear/sun gear tooth ratio of the planetary gearset 230. The overall numerical value of the first forward speed ratio is determined by the ring gear/sun gear tooth ratios of the planetary gearsets 230 and 240.

The second forward speed ratio is established with the engagement of the torque-transmitting mechanisms 252, 256, and 258. The first to second ratio interchange is a single transition shift. The sun gear member 222, planet carrier assembly member 236, planet carrier assembly member 246 are driven at a speed determined by the speeds of the planet carrier assembly member 226 and the ring gear member 224, and the ring gear/sun gear tooth ratio of the planetary gearset 220. The sun gear members 242 and 232 are driven at a speed determined by the speed of the planet carrier assembly member 246 and the ring gear/sun gear tooth ratio of the planetary gearset 240. The ring gear member 234, ring gear member 224, and output shaft 19 are driven at a speed determined by the speed of the planet carrier assembly member 236, the speed of the sun gear member 232, and the ring gear/sun gear tooth ratio of the planetary gearset 230. The overall numerical value of the second forward speed ratio is determined by the ring gear/sun gear tooth ratios of the planetary gearsets 220, 230, and 240.

The third forward speed ratio is established with the engagement of the torque-transmitting mechanisms 250, 252, and 256. The second to third ratio interchange is a single transition shift. During the third forward speed ratio, the sun gear members 242 and 232 are driven at a speed determined by the speed of the planet carrier assembly member 246 and the ring gear/sun gear tooth ratio of the planetary gearset 240. The planet carrier assembly member 236 and sun gear member 222 are driven at a speed determined by the speed of the sun gear member 232, the speed of the ring gear member 234, and the ring gear/sun gear tooth ratio of the planetary gearset 230. The ring gear member 224 and ring gear member 234 are driven at a speed determined by the speed of the sun gear member 222, the speed of the planet carrier assembly member 226, and the ring gear/sun gear tooth ratio of the planetary gearset 220. The overall numerical value of the third forward speed ratio is determined by the ring gear/sun gear tooth ratio of all three planetary gearsets 220, 230, and 240.

The fourth forward speed ratio is established with the engagement of the torque-transmitting mechanisms 250, 252, and 254. The third to fourth ratio interchange is a single transition shift. The engagement of the torque-transmitting mechanisms 252 and 254 selectively interconnect two members of the planetary gearset 220 such that when the planet carrier assembly member 226 is driven at the speed of the input shaft 17, the output shaft 19 will also rotate at the same speed. The fourth forward speed ratio is a direct drive, or 1:1 ratio.

The fifth forward speed ratio is established with the engagement of the torque-transmitting mechanisms 250, 254, and 258. The fourth to fifth ratio interchange is a single transition shift. During the fifth forward speed ratio, the sun gear members 242 and 232 are driven at a speed determined by the speed of the planet carrier assembly member 246 and the ring gear/sun gear tooth ratio of the planetary gearset 240. The ring gear member 234 and sun gear member 222 are driven at a speed determined by the speed of the sun gear member 232, the speed of the planet carrier assembly member 236, and the ring gear/sun gear tooth ratio of the planetary gearset 230. The ring gear member 224 and therefore output shaft 19 are driven at a speed determined by the speed of the sun gear member 222, the speed of the planet carrier assembly member 226, and ring gear/sun gear tooth ratio of the planetary gearset 220. The overall numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 254, 256, and 258. The fifth to sixth ratio interchange is a single transition shift. This combination of torque-transmitting mechanisms effectively hold the planetary gearsets 240 and 230, as well as the sun gear member 222, stationary. The ring gear member 224 and output shaft 19 are driven forwardly at an increased speed ratio determined by the speed of the planet carrier assembly member 226 and the ring gear/sun gear tooth ratio of the planetary gearset 220. The overall numerical value of the sixth forward speed ratio is determined by the ring gear/sun gear tooth ratio of the planetary gearset 220.

The truth table and chart of FIG. 6, as suggested above, describe the interchange sequence of the torque-transmitting mechanisms necessary to establish the forward and reverse speed ratios. The truth table also presents an example of the speed ratio numbers that are available with the embodiment shown in FIG. 5. These ratio numbers are determined utilizing the ring gear/sun gear tooth ratios given as examples in FIG. 6. Also given in FIG. 6 is a chart of the ratio steps between adjacent forward speed ratios and the ratio step between the forward first gear and reverse ratios. For example, the step ratio between the first and second ratios is 1.73 when the example tooth ratios are employed.

Figures 7, 8:
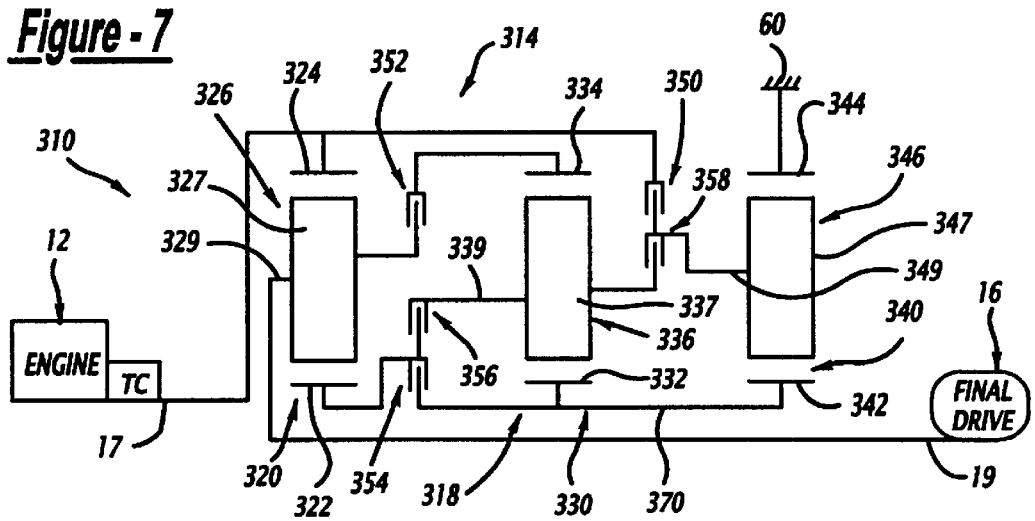
FIG. 7 is a schematic representation of a powertrain having another transmission family member incorporating the present invention.
FIG. 8 is a truth table and chart describing some of the operating characteristics of the powertrain depicted in FIG. 7.

A powertrain 310, shown in FIG. 7, includes the conventional engine and torque converter 12, a planetary transmission 314, and the conventional final drive mechanism 16. The planetary transmission 314 includes an input shaft 17, a planetary gear arrangement 318, and the output shaft 19. The planetary gear arrangement 318 includes three planetary gearsets 320, 330, and 340.

The planetary gearset 320 includes a sun gear member 322, a ring gear member 324, and a planet carrier assembly member 326 which includes a plurality of pinion gears 327 rotatably mounted on a carrier 329 and disposed in meshing relationship with both the sun gear member 322 and the ring gear member 324.

The planetary gearset 330 includes a sun gear member 332, a ring gear member 334, and a planet carrier assembly member 336 which includes a plurality of pinion gears 337 rotatably mounted on a carrier 339 and disposed in meshing relationship with both the sun gear member 332 and the ring gear member 334.

The planetary gearset 340 includes a sun gear member 342, a ring gear member 344, and a planet carrier assembly member 346 which includes a plurality of pinion gears 347 rotatably mounted on a carrier 349 and disposed in meshing relationship with both the sun gear member 342 and the ring gear member 344.

The planetary gear arrangement 318 also includes five torque-transmitting mechanisms 350, 352, 354, 356, and 358. The torque-transmitting mechanisms are conventional selectively engaged fluid-operated devices. The torque-transmitting mechanisms are preferably controlled by a conventional electro-hydraulic system, not shown, that includes a preprogrammed digital computer.

The input shaft 17 is continuously connected with the ring gear member 324 and selectively connectable with the planet carrier assembly member 346 through the torque-transmitting mechanism 350. The output shaft 19 is continuously connected with the planet carrier assembly member 326 and selectively connectable with the ring gear member 334 through the torque-transmitting mechanism 352. The sun gear members 332 and 342 are continuously interconnected through an interconnecting member 370 and are selectively connectable with the sun gear member 322 through the torque-transmitting mechanism 354. The ring gear member 344 is continuously connected with the transmission housing 60. The planet carrier assembly member 336 is selectively connectable with the sun gear member 322 through the torque-transmitting mechanism 356, and with the planet carrier assembly member 346 through the torque-transmitting mechanism 358.

The truth table of FIG. 8 describes the engagement and interchange sequence of the torque-transmitting mechanisms 350, 352, 354, 356, and 358 to establish the reverse speed ratio and six forward speed ratios which are possible with the planetary gear arrangement 318.

To establish the reverse speed ratio, the torque-transmitting mechanisms 350, 352, and 358 are engaged. During the reverse speed ratio, the sun gear members 342 and 332 are driven forwardly at speed determined by the speed of the planet carrier assembly member 346 and the ring gear/sun gear tooth ratio of the planetary gearset 340. The ring gear member 334 and therefore output shaft 19 are driven in reverse at a speed determined by the speed of the sun gear member 332, the speed of the planet carrier assembly member 336, and the ring gear/sun gear tooth ratio of the planetary gearset 330. The overall numerical value of the reverse speed ratio is determined by the ring gear/sun gear tooth ratios of the planetary gearsets 330 and 340.

The first forward speed ratio is established with the engagement of the torque-transmitting mechanisms 352, 354, and 358. The torque-transmitting mechanisms 352 and 358 may remain engaged through the neutral condition thereby simplifying the forward/reverse interchange. During the first forward speed ratio, the sun gear members 322, 332, and 342 are driven at a speed determined by the speed of the ring gear member 324, the speed of the planet carrier assembly member 326, and the ring gear/sun gear tooth ratio of the planetary gearset 320. The planet carrier assembly member 346 and the planet carrier assembly member 336 are driven at a speed determined by the speed of the sun gear member 342 and the ring gear/sun gear tooth ratio of the planetary gearset 340. The ring gear member 334 and output shaft 19 are driven at a speed determined by the speed of the sun gear member 322, the speed of the planet carrier assembly member 336, and the ring gear/sun gear tooth ratio of the planetary gearset 330. The overall numerical value of the first forward speed ratio is determined by the ring gear/sun gear tooth ratios of all three planetary gearsets 320, 330, and 340.

The second forward speed ratio is established with the engagement of the torque-transmitting mechanisms 352, 356, and 358. The first to second interchange is a single transition shift. During the second forward speed ratio, the sun gear member 322, planet carrier assembly member 336, and planet carrier assembly member 346 are driven at a speed determined by the speed of the ring gear member 324, the speed of the planet carrier assembly member 326, and the ring gear/sun gear tooth ratio of the planetary gearset 320. The sun gear members 342 and 332 are driven at a speed determined by the speed of the planet carrier assembly member 346 and the ring gear/sun gear tooth ratio of the planetary gearset 340. The ring gear member 334, planet carrier assembly member 326, and output shaft 19 are driven at a speed determined by the speed of the sun gear member 332, the speed of the planet carrier assembly member 336, and the ring gear/sun gear tooth ratio of the planetary gearset 330. The overall numerical value of the second forward speed ratio is determined by the ring gear/sun gear tooth ratio of all three planetary gearsets 320, 330, and 340.

The third forward speed ratio is established with the engagement of the torque-transmitting mechanisms 354, 356, and 358. This combination of engagements holds the planetary gearsets 340 and 330, and the sun gear member 322, stationary. The output shaft 19 and planet carrier assembly member 326 are driven at a speed determined by the speed of the ring gear member 324 and the ring gear/sun gear tooth ratio of the planetary gearset 320. The overall numerical value of the third forward speed ratio is determined by the ring gear/sun gear tooth ratio of the planetary gearset 320.

The fourth forward speed ratio is established with the engagement of the torque-transmitting mechanisms 350, 356, and 358. The third to fourth interchange is a single transition shift. With this combination of engagements, the sun gear member 322 is driven by the input shaft 17, such that a 1:1 drive ratio is provided during the fourth forward speed ratio.

The fifth forward speed ratio is established with the engagement of the torque-transmitting mechanisms 350, 352, and 356. This is a single transition interchange. During the fifth forward speed ratio, the sun gear members 342 and 332 are driven forwardly at a speed determined by the speed of the planet carrier assembly member 346 and the ring gear/sun gear tooth ratio of the planetary gearset 340. The planet carrier assembly member 336 and the sun gear member 322 are driven at a speed determined by the speed of the sun gear member 332, the speed of the ring gear member 334, and the ring gear/sun gear tooth ratio of the planetary gearset 330. The planet carrier assembly member 326, ring gear member 334, and output shaft 19 are driven at a speed determined by the speed of the sun gear member 322, the speed of the ring gear member 324, and the ring gear/sun gear tooth ratio of the planetary gearset 320. The overall numerical value of the fifth forward speed ratio is determined by the ring gear/sun gear tooth ratios of all three planetary gearsets 320, 330, and 340.

The sixth forward speed ratio is established with the engagement of the torque-transmitting mechanisms 350, 352, and 354. This is a single transition ratio interchange. The sun gear members 342, 332, and 322 are driven at a speed determined by the speed of the planet carrier assembly member 346 and the ring gear/sun gear tooth ratio of the planetary gearset 340. The planet carrier assembly member 326 and output shaft 19 are driven at a speed determined by the speed of the sun gear member 322, the speed of the ring gear member 324, and the ring gear/sun gear tooth ratio of the planetary gearset 320. The overall numerical value of the sixth forward speed ratio is determined by the ring gear/sun gear tooth ratios of the planetary gearsets 320 and 340.

Figures 9, 10:
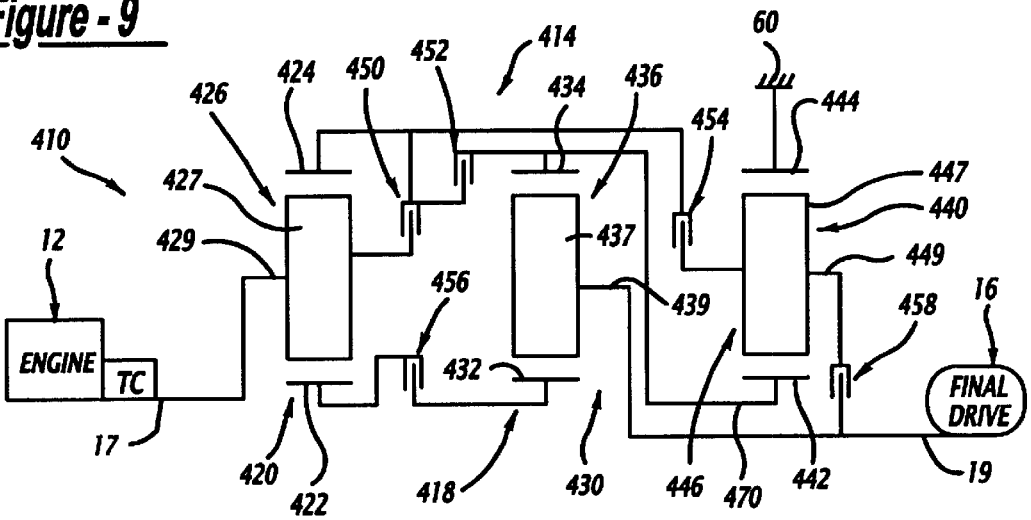
FIG. 9 is a schematic representation of a powertrain having another transmission family member incorporating the present invention.
FIG. 10 is a truth table and chart describing some of the operating characteristics of the powertrain depicted in FIG. 9.

A powertrain 410, shown in FIG. 9, includes the conventional engine and torque converter 12, a planetary transmission 414, and the conventional final drive mechanism 16. The engine and torque converter 12 are connected with the planetary transmission 414 through the input shaft 17, and the final drive mechanism 16 is connected with the transmission 414 through the output shaft 19. The planetary transmission 414 includes a planetary gear arrangement 418 that has three planetary gearsets 420, 430, and 440, and five torque-transmitting mechanisms 450, 452, 454, 456, and 458. Each of the planetary gearsets is a simple type planetary gearset and each of the torque-transmitting mechanisms are of the rotating type, commonly termed clutches.

The planetary gearset 420 includes a sun gear member 422, a ring gear member 424, and a planet carrier assembly member 426 which includes a plurality of pinion gears 427 rotatably mounted on a carrier 429 and disposed in meshing relationship with both the sun gear member 422 and the ring gear member 424.

The planetary gearset 430 includes a sun gear member 432, a ring gear member 434, and a planet carrier assembly member 436 which includes a plurality of pinion gears 437 rotatably mounted on a carrier 439 and disposed in meshing relationship with both the sun gear member 432 and the ring gear member 434.

The planetary gearset 440 includes a sun gear member 442, a ring gear member 444, and a planet carrier assembly member 446 which includes a plurality of pinion gears 447 rotatably mounted on a carrier 449 and disposed in meshing relationship with both the sun gear member 442 and the ring gear member 444.

The planet carrier assembly member 426 is continuously connected with the input shaft 17. The planet carrier assembly member 436 is continuously connected with the output shaft 19. The ring gear member 434 and sun gear member 442 are continuously interconnected by an interconnecting member 470, and the ring gear member 444 is continuously connected with the transmission housing 60. The input shaft 17 is selectively connectable with the ring gear member 424 through the torque-transmitting mechanism 450. The output shaft 19 is selectively connectable with the planet carrier assembly member 446 through the torque-transmitting mechanism 458. The interconnecting member 470 is selectively connectable with the ring gear member 424 through the torque-transmitting mechanism 452. The ring gear member 424 is selectively connectable with the planet carrier assembly member 446 through the torque-transmitting mechanism 454. The sun gear members 422 and 432 are selectively interconnectable through the torque-transmitting mechanism 456.

The truth table and chart shown in FIG. 10 define the torque-transmitting mechanism engagement sequence required for each of the forward speed ratios and the reverse speed ratio 450, 452, 454, 456, and 458. The truth table also indicates that the torque-transmitting mechanisms 450 and 458 can remain engaged through the neutral condition thereby simplifying the forward/reverse interchange. The examples of ratios for the various speeds are calculated utilizing the ring gear/sun gear tooth ratios, also given by way of example in FIG. 10. As is evident from the truth table of FIG. 10, all of the single step forward ratio interchanges are of the single transition type. Also, the double step interchanges, such as first to third and second to fourth, are of the single transition interchange type. The chart of FIG. 10 illustrates the step ratios between adjacent speed ratios that are accomplished with the given ratio numbers. For example, the first to second step ratio is 1.64.

Those skilled in the art will recognize that the numerical value of the reverse speed ratio is determined by the ring gear/sun gear tooth ratios of the planetary gearsets 430 and 440. The numerical value of the first forward speed ratio is determined by the ring gear/sun gear tooth ratio of the planetary gearset 440. The numerical of the second forward speed ratio is determined by the ring gear/sun gear tooth ratios of all the planetary gearsets 420, 430, and 440. The third forward speed ratio is a direct drive ratio, or a 1:1 ratio. The numerical value of the fourth forward speed ratio is determined by the ring gear/sun gear tooth ratios of the planetary gearsets 420 and 430. The numerical value of the fifth forward speed ratio is determined by the ring gear/sun gear tooth ratios of the planetary gearsets 430 and 440. The numerical value of the sixth forward speed ratio is determined by the ring gear/sun gear tooth ratios of all of the planetary gearsets 420, 430, and 440.

Figures 11, 12:
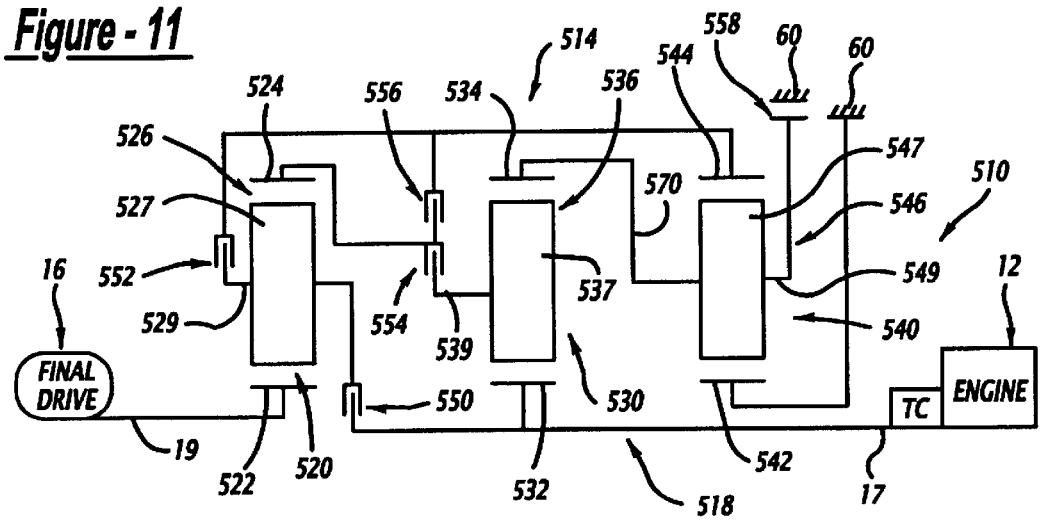
FIG. 11 is a schematic representation of a powertrain having another transmission family member incorporating the present invention.
FIG. 12 is a truth table and chart describing some of the operating characteristics of the powertrain depicted in FIG. 11.

A powertrain 510, shown in FIG. 11, includes the conventional engine and torque converter 12, a planetary transmission 514, and the conventional final drive mechanism 16. The engine and torque converter 12 are drivingly connected with the planetary transmission 514 through the input shaft 17, and the transmission 514 is drivingly connected with the final drive mechanism 16 through the output shaft 19. The planetary transmission 514 includes a planetary gear arrangement 518 that is comprised of the three planetary gearsets 520, 530, and 540, and five torque-transmitting mechanisms 550, 552, 554, 556, and 558. The torque-transmitting mechanisms 550, 552, 554, and 556 are rotating type torque-transmitting mechanisms, commonly termed clutches. The torque-transmitting mechanism 558 is a stationary type torque-transmitting mechanism, commonly termed a brake.

The planetary gearset 520 includes a sun gear member 522, a ring gear member 524, and a planet carrier assembly member 526 which includes a plurality of pinion gears 527 rotatably mounted on a carrier 529 and disposed in meshing relationship with both the sun gear member 522 and the ring gear member 524.

The planetary gearset 530 includes a sun gear member 532, a ring gear member 534, and a planet carrier assembly member 536 which includes a plurality of pinion gears 537 rotatably mounted on a carrier 539 and disposed in meshing relationship with both the sun gear member 532 and the ring gear member 534.

The planetary gearset 540 includes a sun gear member 542, a ring gear member 544, and a planet carrier assembly member 546 which includes a plurality of pinion gears 547 rotatably mounted on a carrier 549 and disposed in meshing relationship with both the sun gear member 542 and the ring gear member 544.

The input shaft 17 is continuously connected with the sun gear member 532 and selectively connectable with the planet carrier assembly member 526 through the torque-transmitting mechanism 550. The output shaft 19 is continuously connected with the sun gear member 522. The planet carrier assembly member 526 is selectively connectable with the ring gear member 544 through the torque-transmitting mechanism 552. The ring gear member 524 is selectively connectable with the planet carrier assembly member 536 through the torque-transmitting mechanism 554. The ring gear member 524 is also selectively connectable with the ring gear member 544 through the torque-transmitting mechanism 556. The ring gear member 534 and planet carrier assembly member 546 are continuously interconnected by an interconnecting member 570, and are selectively connectable with the transmission housing 60 through the torque-transmitting mechanism 558. The sun gear member 542 is continuously connected with the transmission housing 60.

The truth table and chart shown in FIG. 12 define the engagement sequence and combination of the torque-transmitting mechanisms 550, 552, 554, 556, and 558 that are utilized to establish the reverse drive ratio and the six forward speed ratios. It should be noted that the torque-transmitting mechanisms 552 and 554 are engaged through the neutral condition which simplifies the forward/reverse shift. The numerical values given for the speed ratios, by way of example, have been established utilizing the ring gear/sun gear tooth ratios given in FIG. 12. The R1/S1 value is the ring gear/sun gear tooth ratio of the planetary gearset 520; the R2/S2 value is the ring gear/sun gear tooth ratio of the planetary gearset 530; and the R3/S3 value is the ring gear/sun gear tooth ratio of the planetary gearset 540.

Those skilled in the art will recognize that the combination of torque-transmitting mechanism engagement shown for reverse will provide the numerical value of the reverse ratio to be determined from the planetary gearsets 520 and 530. The numerical value of the first forward speed ratio is determined utilizing the ring gear/sun gear tooth ratios of the planetary gearsets 530 and 540. The numerical value of the second forward speed ratio is one or a direct drive. The, numerical values of the third forward speed ratio and the fourth forward speed ratio are determined utilizing the ring gear/sun gear tooth ratios of all three planetary gearsets 520, 530, and 540. The numerical value of the fifth forward speed ratio is determined utilizing the ring gear/sun gear tooth ratios of the planetary gearsets 520 and 530. The numerical value of the sixth forward speed ratio is determined utilizing the ring gear/sun gear tooth ratio of the planetary gearset 520.

It can also be determined from the truth table of FIG. 12 that all of the single step forward ratio interchanges are of the single transition variety, as are all of the double step ratio interchanges. The chart of FIG. 12 describes the ratio steps of the first through sixth forward speed ratios as well as the reverse to first ratio step. For example, the ratio step from first to second is 1.75.

Figures 13, 14:
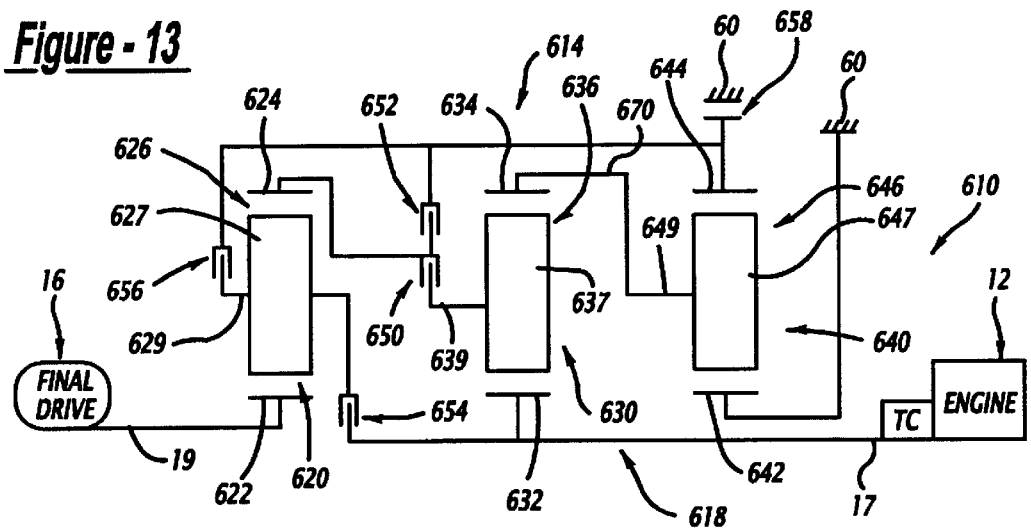
FIG. 13 is a schematic representation of a powertrain having another transmission family member incorporating the present invention.
FIG. 14 is a truth table and chart describing some of the operating characteristics of the powertrain depicted in FIG. 13.

A powertrain 610, shown in FIG. 13, includes the conventional engine and torque converter 12, a planetary transmission 614, and the conventional final drive mechanism 16. The engine and torque converter 12 are drivingly connected with the planetary transmission 614 through the input shaft 17, and the transmission 614 is drivingly connected with the final drive mechanism 16 through the output shaft 19. The planetary transmission 614 includes a planetary gear arrangement 618 that is comprised of the three planetary gearsets 620, 630, and 640, and five torque-transmitting mechanisms 650, 652, 654, 656, and 658. The torque-transmitting mechanisms 650, 652, 654, and 656 are rotating type torque-transmitting mechanisms, commonly termed clutches. The torque-transmitting mechanism 658 is a stationary type torque-transmitting mechanism, commonly termed a brake.

The planetary gearset 620 includes a sun gear member 622, a ring gear member 624, and a planet carrier assembly member 626 which includes a plurality of pinion gears 627 rotatably mounted on a carrier 629 and disposed in meshing relationship with both the sun gear member 622 and the ring gear member 624.

The planetary gearset 630 includes a sun gear member 632, a ring gear member 634, and a planet carrier assembly member 636 which includes a plurality of pinion gears 637 rotatably mounted on a carrier 639 and disposed in meshing relationship with both the sun gear member 632 and the ring gear member 634.

The planetary gearset 640 includes a sun gear member 642, a ring gear member 644, and a planet carrier assembly member 646 which includes a plurality of pinion gears 647 rotatably mounted on a carrier 649 and disposed in meshing relationship with both the sun gear member 642 and the ring gear member 644.

The input shaft 17 is continuously connected with the sun gear member 632, and selectively connectable with the planet carrier assembly member 626 through the torque-transmitting mechanism 654. The output shaft 19 is continuously connected with the sun gear member 620. The planet carrier assembly member 646 is continuously interconnected with the ring gear member 634 through a interconnecting member 670. The sun gear member 642 is continuously connected with the transmission housing 60. The planet carrier assembly member 626 is selectively connectable with the ring gear member 644 through the torque-transmitting mechanism 656. The ring gear member 624 is selectively connectable with the planet carrier assembly member 636 through the torque-transmitting mechanism 650, and selectively connectable with the ring gear member 644 through the torque-transmitting mechanism 652. The ring gear member 644 is selectively connectable with the transmission housing 60 through the torque-transmitting mechanism 658.

The truth table shown in FIG. 14 defines the torque-transmitting mechanism engagement sequence required for each of the forward speed ratios and the reverse speed ratio. The truth table also indicates that the torque-transmitting mechanisms 650 and 656 can remain engaged through the neutral condition thereby simplifying the forward/reverse shift interchange. The numerical values given by way of example in the truth table have been determined utilizing the ring gear/sun gear tooth ratios also given by way of example in FIG. 14. The R1/S1 value is the ring gear/sun gear tooth ratio of the planetary gearset 620; the R2/S2 value is the ring gear/sun gear tooth ratio of the planetary gearset 630; and the R3/S3 value is the ring gear/sun gear tooth ratio of the planetary gearset 640. It can be readily determined from the truth table that each of the single step and double step interchanges in the forward direction are of the single transition variety. The chart of FIG. 14 describes the ratio steps between adjacent forward speed ratios and between the reverse and first forward speed ratio. For example, the first to second step ratio is 1.75.

Those skilled in the art, upon reviewing the truth table, will recognize that the numerical value of the reverse speed ratio is determined utilizing the ring gear/sun gear tooth ratios of the planetary gearsets 620 and 630. The numerical value of the first forward speed ratio is determined utilizing the ring gear/sun gear tooth ratios of the planetary gearsets 630 and 640. The second forward speed ratio is a direct drive, or 1:1 ratio. The numerical values of the third forward speed ratio and the fourth forward speed ratio are determined utilizing the ring gear/sun gear tooth ratios of the planetary gearsets 620, 630, and 640. The numerical value of the fifth forward speed ratio is determined utilizing the ring gear/sun gear tooth ratios of the planetary gearsets 620 and 630. The numerical value of the sixth forward speed ratio is determined utilizing the ring gear/sun gear tooth ratio of the planetary gearset 620.

Figures 15, 16:
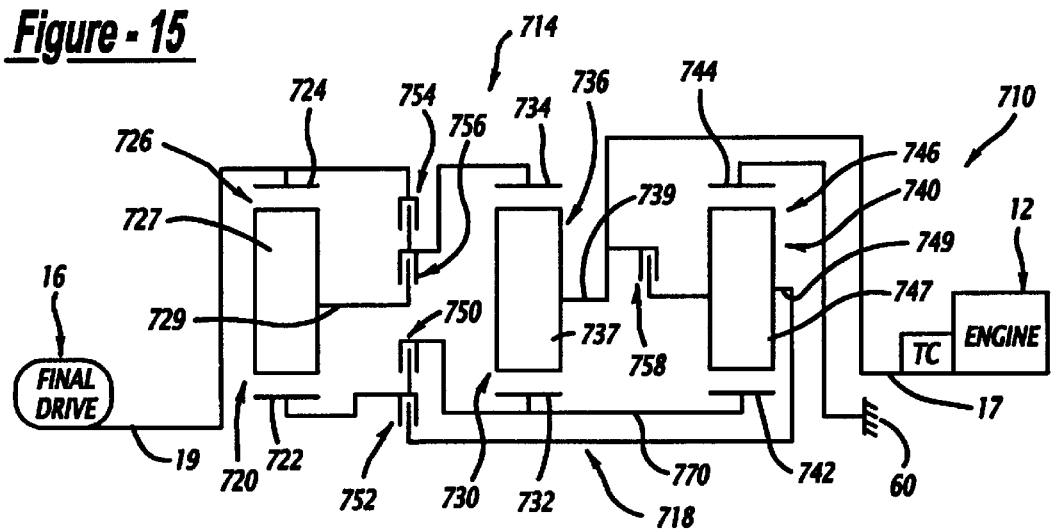
FIG. 15 is a schematic representation of a powertrain having another transmission family member incorporating the present invention.
FIG. 16 is a truth table and chart describing some of the operating characteristics of the powertrain depicted in FIG. 15.

A powertrain 710, shown in FIG. 15, includes the conventional engine and torque converter 12, a planetary transmission 714, and the conventional final drive mechanism 16. The planetary transmission 714 includes a planetary gear arrangement 718, the input shaft 17, and output shaft 19. The planetary gear arrangement 718 includes three planetary gearsets 720, 730, and 740, and five rotating torque-transmitting mechanisms, or clutches, 750, 752, 754, 756, and 758. The torque-transmitting mechanisms are engaged as described in the truth table of FIG. 16, in combinations of three to establish six forward speed ratios and one reverse speed ratio.

The planetary gearset 720 includes a sun gear member 722, a ring gear member 724, and a planet carrier assembly member 726 which includes a plurality of pinion gears 727 rotatably mounted on a carrier 729 and disposed in meshing relationship with both the sun gear member 722 and the ring gear member 724.

The planetary gearset 730 includes a sun gear member 732, a ring gear member 734, and a planet carrier assembly member 736 which includes a plurality of pinion gears 737 rotatably mounted on a carrier 739 and disposed in meshing relationship with both the sun gear member 732 and the ring gear member 734.

The planetary gearset 740 includes a sun gear member 742, a ring gear member 744, and a planet carrier assembly member 746 which includes a plurality of pinion gears 747 rotatably mounted on a carrier 749 and disposed in meshing relationship with both the sun gear member 742 and the ring gear member 744.

The input shaft 17 is continuously connected with the planet carrier assembly member 736, and selectively connectable with the planet carrier assembly member 746 through the torque-transmitting mechanism 758. The output shaft 19 is continuously connected with the ring gear member 724, and selectively connectable with the ring gear member 734 through the torque-transmitting mechanism 754. The sun gear members 742 and 732 are continuously interconnected through an interconnecting member 770, and selectively connectable with the sun gear member 720 through the torque-transmitting mechanism 750. The ring gear member 744 is continuously connected with transmission housing 60. The planet carrier assembly member 746 is selectively connectable with the sun gear member 722 through the torque-transmitting mechanism 752.

The truth table of FIG. 16, as mentioned above, describes the engagement sequence of the torque-transmitting mechanisms that are utilized to provide the speed ratios of the transmission 714. The truth table also provides a numerical value for each of the speed ratios by way of example. The numerical values were determined utilizing the ring gear/sun gear tooth ratios also given FIG. 16. The R1/S1 value is the ring gear/sun gear tooth ratio of the planetary gearset 720;

the R2/S2 value is the ring gear/sun gear tooth ratio of the planetary gearset 730; and the R3/S3 value is the ring gear/sun gear tooth ratio of the planetary gearset 740. Also given in FIG. 16 is a chart showing the step ratio between adjacent forward steps and the reverse to first step. For example, the first to second step ratio is 1.67.

Those skilled in the art will recognize that the numerical value of the reverse speed ratio is determined utilizing the ring gear/sun gear tooth ratios of all three planetary gearsets 720, 730, and 740. The numerical value of the first forward speed ratio is also determined utilizing the ring gear/sun gear tooth ratios of all three planetary gearsets 720, 730, and 740. The numerical values of the second and third forward speed ratios are determined utilizing the ring gear/sun gear tooth ratios of the planetary gearsets 730 and 740. The numerical value of the fourth forward speed ratio is one, or a direct drive ratio. The numerical value of the fifth forward speed ratio is determined utilizing the ring gear/sun gear tooth ratio of the planetary gearset 730. The numerical value of the sixth forward speed ratio is determined utilizing the ring gear/sun gear tooth ratios of the planetary gearsets 720 and 730.

Figures 17, 18:
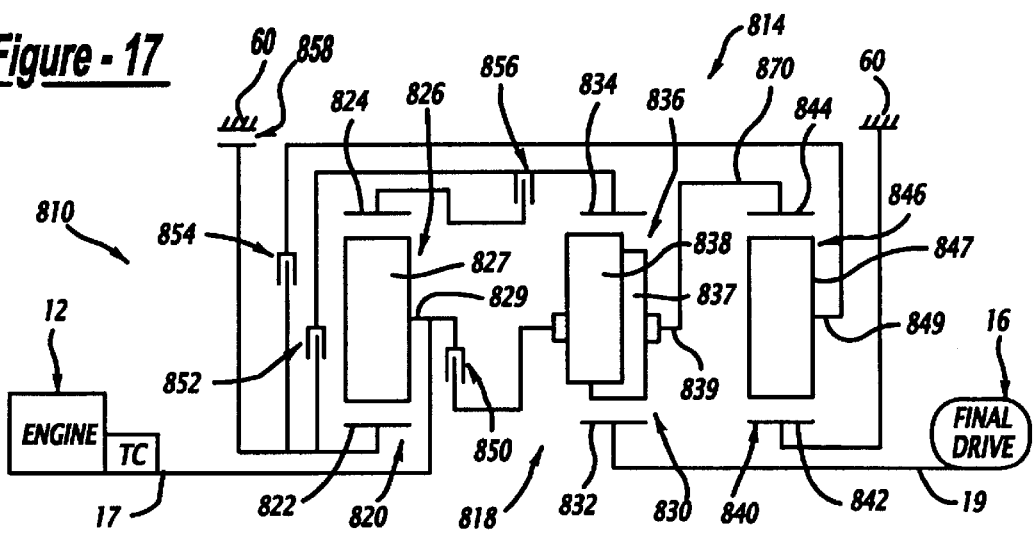
FIG. 17 is a schematic representation of a powertrain having another transmission family member incorporating the present invention.
FIG. 18 is a truth table and chart describing some of the operating characteristics of the powertrain depicted in FIG. 17.

A powertrain 810, shown in FIG. 17, includes the conventional engine and torque converter 12, a planetary transmission 814, and the final drive mechanism 16. The planetary transmission 814 includes a planet carrier assembly member 818 that is comprised of the input shaft 17, the output shaft 19, and three planetary gearsets 820, 830, and 840, as well as five torque-transmitting mechanisms 850, 852, 854, 856, and 858. The torque-transmitting mechanisms 850, 852, 854, and 856 are rotating type torque-transmitting mechanisms, commonly termed clutches. The torque-transmitting mechanism 858 is a stationary type torque-transmitting mechanism, or brake.

The planetary gearset 820 includes a sun gear member 822, a ring gear member 824, and a planet carrier assembly member 826 which includes a plurality of pinion gears 827 rotatably mounted on a carrier 829 and disposed in meshing relationship with both the sun gear member 822 and the ring gear member 824.

The planetary gearset 830 includes a sun gear member 832, a ring gear member 834, and a planet carrier assembly member 836 which includes a pair of intermeshing of pinion gears 837 and 838 rotatably mounted on a carrier 839 and meshing with the sun gear member 832 and the ring gear member 834, respectively.

The planetary gearset 840 includes a sun gear member 842, a ring gear member 844, and a planet carrier assembly member 846 which includes a plurality of pinion gears 847 rotatably mounted on a carrier 849 and disposed in meshing relationship with both the sun gear member 842 and the ring gear member 844.

The truth table shown in FIG. 18 describes the torque-transmitting mechanism engagement sequence utilized to provide a reverse drive ratio and six forward speed ratios in the planetary gear arrangement 818. The truth table also indicates that the torque-transmitting mechanisms 850 and 852 can remain engaged through the neutral condition thereby simplifying the forward/reverse interchange. The numerical values set forth in the truth table are given by way of example and are calculated from the example tooth ratios also given in FIG. 18. The R1/S1 value is the ring gear/sun gear tooth ratio of the planetary gearset 820; the R2/S2 value is the ring gear/sun gear tooth ratio of the planetary gearset 830; and the R3/S3 value is the ring gear/sun gear tooth ratio of the planetary gearset 840. The chart of FIG. 18 provides the ratio steps that are present between adjacent forward speed ratios and between the reverse and first speed ratio. For example, the first to second step ratio is 1.53.

Those skilled in the art will recognize that the numerical value of the reverse speed ratio is determined utilizing the ring gear/sun gear tooth ratio of the planetary gearset 830. The numerical value of the first and second forward speed ratios is determined utilizing the ring gear/sun gear tooth ratios of the planetary gearsets 830 and 840. The third forward speed ratio is a direct drive, or a value of one. The numerical value of the fourth forward speed ratio is determined utilizing the ring gear/sun gear tooth ratios of all three planetary gearsets 820, 830, and 840. The numerical value of the fifth and sixth forward speed ratios is determined utilizing the ring gear/sun gear tooth ratios of the planetary gearsets 820 and 830.

Figures 19, 20:
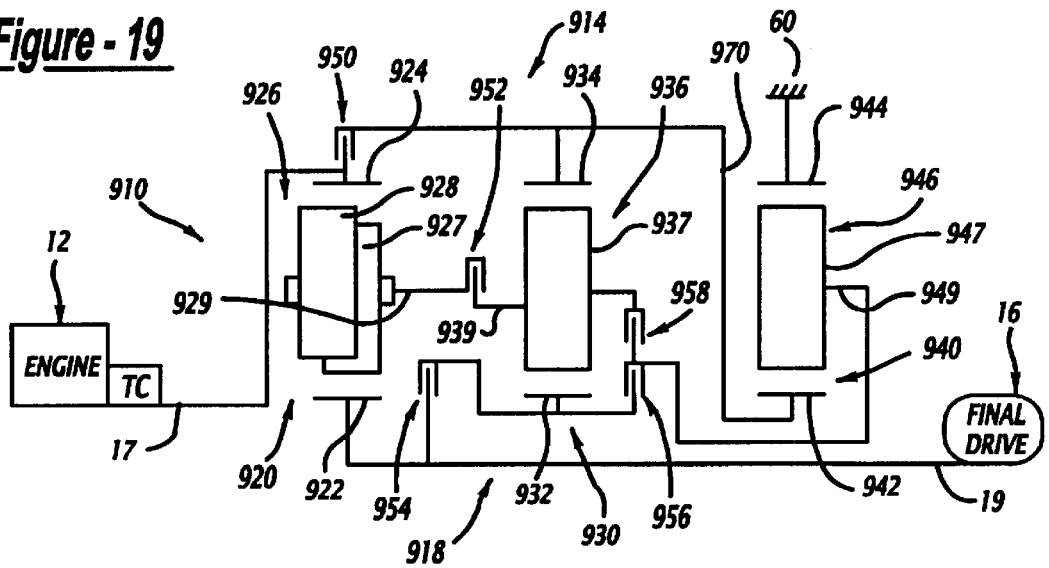
FIG. 19 is a schematic representation of a powertrain having another transmission family member incorporating the present invention.
FIG. 20 is a truth table and chart describing some of the operating characteristics of the powertrain depicted in FIG. 19.

A powertrain 910, shown in FIG. 19, includes the conventional engine and torque converter 12, a planetary transmission 914, and the final drive mechanism 16. The planetary transmission 914 includes a planetary gear arrangement 918, the input shaft 17, and output shaft 19. The planetary gear arrangement 918 includes three planetary gearsets 920, 930, and 940, and five rotating torque-transmitting mechanisms, or clutches, 950, 952, 954, 956, and 958. The torque-transmitting mechanisms are engaged as described in the truth table of FIG. 20, in combinations of three to establish six forward speed ratios and one reverse speed ratio.

The planetary gearset 920 includes a sun gear member 922, a ring gear member 924, and a planet carrier assembly member 926 which includes a pair of intermeshing pinion gears 927 and 928 rotatably mounted on a carrier 929 and meshingly engage the sun gear member 922 and the ring gear member 924, respectively.

The planetary gearset 930 includes a sun gear member 932, a ring gear member 934, and a planet carrier assembly member 936 which includes a plurality of pinion gears 937 rotatably mounted on a carrier 939 and disposed in meshing relationship with both the sun gear member 932 and the ring gear member 934.

The planetary gearset 940 includes a sun gear member 942, a ring gear member 944, and a planet carrier assembly member 946 which includes a plurality of pinion gears 947 rotatably mounted on a carrier 949 and disposed in meshing relationship with both the sun gear member 942 and the ring gear member 944.

The input shaft 17 is continuously connected with the ring gear member 924, and selectively connectable with the ring gear member 934 and sun gear member 942 through the torque-transmitting mechanism 950. The ring gear member 934 and sun gear member 942 are continuously interconnected by an interconnecting 970. The output shaft 19 is continuously connected with the sun gear member 922, and selectively connectable with the sun gear member 932 through the torque-transmitting mechanism 954. The ring gear member 944 is continuously connected with the transmission housing 60. The sun gear member 932 and planet carrier assembly member 946 are selectively interconnectable through the torque-transmitting mechanism 956. The planet carrier assembly member 936 is selectively connectable with the planet carrier assembly member 946 through the torque-transmitting mechanism 958, and selectively connectable with the planet carrier assembly member 926 through the torque-transmitting mechanism 952.

The truth table and chart shown in FIG. 20, as explained above, describe the engagement sequence of the torque-transmitting mechanisms that establish the speed ratios. The truth table also provides an example of a ratio value for each of the speed ratios. These example values are determined utilizing the example ring gear/sun gear tooth ratios, also given in FIG. 20. The R1/S1 value is the ring gear/sun gear tooth ratio of the planetary gearset 920; the R2/S2 value is the ring gear/sun gear tooth ratio of the planetary gearset 930; and the R3/S3 value is the ring gear/sun gear tooth ratio of the planetary gearset 940. Also shown in FIG. 20 are the ratio steps provided between the forward speed ratios and between the reverse and first speed ratio. For example, the first to second ratio step is 1.61.

Those skilled in the art will recognize that the numerical value for the reverse speed ratio is determined utilizing the ring gear/sun gear tooth ratios of the planetary gearsets 930 and 940. The numerical value of the first forward speed ratio is determined utilizing the ring gear/sun gear tooth ratio of the planetary gearset 940. The numerical value of the second forward speed ratio is determined utilizing the ring gear/sun gear tooth ratios of all three planetary gearsets 920, 930, and 940. The third forward speed ratio is a one, which is a direct drive. The numerical value of the fourth forward speed ratio is determined utilizing the ring gear/sun gear tooth ratios of all three planetary gearsets 920, 930, and 940. The numerical value of the fifth forward speed ratio is determined utilizing the ring gear/sun gear tooth ratios of the planetary gearsets 920 and 940. The numerical value of the sixth forward speed ratio is determined utilizing the ring gear/sun gear tooth ratio of the planetary gearset 920. Those skilled in the art will also recognize that all of the forward single step ratio interchanges and all of the double step ratio interchanges are of the single transition variety.

From the foregoing presentation it should be obvious that each planetary gearset has at least one member that is non-continuously interconnected with another member of the transmission. The torque transmitting mechanisms are effective to provide a selective interconnection for those non-continuously interconnected members to establish a connection between them and other members of the transmission or between continuously interconnected members of the transmission such as the input shaft 17, the output shaft 19, or the interconnecting members.

What is claimed is:

1. A family of transmissions having a plurality of family members, each family member comprising:
   an input shaft;
   an output shaft;
   first, second, and third planetary gearsets with each planetary gearset having first, second, and third members;
   an interconnecting member continuously interconnecting said first member of said second planetary gearset with said first member of said third planetary gearset;
   said second member of said third planetary gearset being continuously interconnected with a stationary member;
   said input shaft being continuously interconnected with one member of one of said planetary gearsets;
   said output shaft being continuously interconnected with another member of one of said planetary gearsets;
   a first selectively engageable torque transmitting mechanism selectively interconnecting a member of said first planetary gearset with either said input shaft, said interconnecting member, or another member of one of said planetary gearsets;
   a second selectively engageable torque transmitting mechanism selectively interconnecting a member of said second planetary gearset with either said input shaft, said output shaft, or another member of one of said planetary gearsets;
   a third selectively engageable torque transmitting mechanism selectively interconnecting a member of said third planetary gearset with said input shaft, said output shaft, or another member of one of said planetary gearsets;
   a fourth selectively engageable torque transmitting mechanism selectively interconnecting a member of one of said planetary gearsets with either said interconnecting member or another member of one of said planetary gearsets;
   a fifth selectively engageable torque transmitting mechanism selectively interconnecting a member of one of said planetary gearsets with either another member of one of said planetary gearsets or with a stationary transmission member; and
   said five torque transmitting mechanisms being selectively engageable in combinations of three to establish at least six forward speed ratios and one reverse ratio between said input shaft and said output shaft.

2. The family of transmissions defined in claim 1 further wherein:
   said first, second, and third members of said first, second, and third planetary gearset are each one of a sun gear member, a ring gear member, or a planet carrier assembly member.

3. The family of transmissions defined in claim 2 further wherein:
   each of said planet carrier members has either a plurality of pinion gears rotatably mounted on a carrier and meshingly engaging both said sun gear member and said ring gear member or a plurality of intermeshing pinion gear pairs rotatably mounted on a carrier and meshing with said sun gear member and said ring gear member respectively.

4. A family of transmissions having a plurality of family members wherein each family member comprised:
   an input shaft;
   an output shaft;
   a first planetary gearset having a first member, a second member, and a third member;
   a second planetary gearset having a first member, a second member, and a third member;
   a third planetary gearset having a first member, a second member, and a third member;
   an interconnecting member continuously interconnecting a first member of said second planetary gearset with a first member of said third planetary gearset;
   said second member of said third planetary gearset being continuously interconnected with a stationary transmission housing;
   said input shaft being continuously interconnected with either said first member of said first planetary gearset or with said second member of said second planetary gearset;
   said output shaft being continuously interconnected with either said first member of said first planetary gearset, said second member of said first planetary gearset, or said second member of said second planetary gearset;
   each planetary gearset having at least one non-continuously interconnected member;
   five torque transmitting mechanisms that are selectively engageable to selectively interconnect said input shaft or said output shaft with at least one member of said first, second or third planetary gearset, or selectively interconnect a member of one of said planetary gearsets with another member of one of said planetary gearsets or to a stationary transmission housing; and said five torque transmitting mechanisms being selectively engageable in combinations of three to establish at least six forward speed ratios and one reverse speed ratio between said input shaft and said output shaft.

5. The family of transmissions defined in claim 4 further wherein a plurality of said family members comprise:

a first of said torque transmitting mechanisms being selectively engageable to selectively interconnect said input shaft with either said interconnecting member, one of said second and said third members of said first planetary gearset, or said third member of said third planetary gearset.

6. The family of transmissions defined in claim 4 further wherein a plurality of said family members comprise:

a second of said torque transmitting mechanisms being operable to selectively interconnect said output shaft to said second member of said second planetary gearset or one of said second and third members of said third planetary gearset; or to selectively interconnect said second member of said first planetary gearset with said third member of said third planetary gearset.

7. The family of transmissions defined in claim 4 further wherein a plurality of said family members comprise:

a third of said torque transmitting mechanisms being operable to selectively interconnect said third member of said first planetary gearset with said interconnecting member, or said second member of said second planetary gearset; or to selectively interconnect said second member of said first planetary gearset with said third member of said second or third planetary gearset.

8. The family of transmissions defined in claim 4 further wherein a plurality of said family members comprise:

a fourth of said torque transmitting mechanisms being selectively operable to selectively interconnect said third member of said first planetary gearset with said third member of said second or third planetary gearset; or to selectively interconnect said third members of second and third planetary gearsets.

9. The family of transmissions defined in claim 4 further wherein a plurality of said family members comprise:

a fifth of said torque transmitting mechanisms being selectively operable to selectively interconnect said third member of said third planetary gearset with one of said second and third members of said second planetary gearset; or to selectively interconnect said interconnecting member with said second member of said first planetary gearset; or to selectively interconnect said stationary housing with either said interconnecting member, said third member of said third planetary gearset, or said second member of said first planetary gearset.

* * * * *